(12) United States Patent
Bjorck et al.

(10) Patent No.: US 7,886,626 B2
(45) Date of Patent: Feb. 15, 2011

(54) MULTI-SPEED DUAL CLUTCH TRANSMISSION

(75) Inventors: Per-Gunnar Bjorck, Trollhattan (SE); Mikael Mohlin, Kungälv (SE); John A. Diemer, Farmington Hills, MI (US); Patrick S. Portell, Clarkston, MI (US); Henryk Sowul, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 531 days.

(21) Appl. No.: 11/937,344

(22) Filed: Nov. 8, 2007

(65) Prior Publication Data

US 2008/0134817 A1 Jun. 12, 2008

Related U.S. Application Data

(60) Provisional application No. 60/873,728, filed on Dec. 8, 2006.

(51) Int. Cl.
*F16H 3/08* (2006.01)

(52) U.S. Cl. .......................................... 74/330; 74/340

(58) Field of Classification Search .................... 74/325, 74/329, 330, 331, 340, 370; 192/3.23, 219.4, 192/219.5
See application file for complete search history.

(56) References Cited

U.S. PATENT DOCUMENTS

| | | | | |
|---|---|---|---|---|
| 7,155,994 | B2 * | 1/2007 | Gumpoltsberger | ........... 74/340 |
| 7,383,749 | B2 * | 6/2008 | Schafer et al. | ................ 74/340 |
| 7,437,963 | B2 * | 10/2008 | Haka et al. | .................... 74/329 |
| 7,500,411 | B2 * | 3/2009 | Gumpoltsberger | ........... 74/329 |
| 2008/0161154 | A1 * | 7/2008 | Bjorck et al. | .................. 477/55 |

FOREIGN PATENT DOCUMENTS

| | | |
|---|---|---|
| DE | 10253259 A1 | 5/2004 |
| DE | 10343995 A1 | 5/2005 |
| JP | 11-132319 A | 5/1999 |

\* cited by examiner

*Primary Examiner*—David D Le
*Assistant Examiner*—Justin Holmes

(57) ABSTRACT

A transmission is provided having an input member, an output member, a dual clutch assembly, a countershaft, a plurality of co-planar gear sets, a plurality of interconnecting members, and a plurality of torque transmitting devices. The torque transmitting devices include synchronizer assemblies.

24 Claims, 2 Drawing Sheets

MULTI-SPEED DUAL CLUTCH TRANSMISSION

CROSS-REFERENCE TO RELATED APPLICATIONS

This application claims the benefit of U.S. Provisional Application No. 60/873,728, filed on Dec. 8, 2006. The disclosure of the above application is incorporated herein by reference.

TECHNICAL FIELD

The present disclosure relates to transmissions, and more particularly to a multiple speed transmission having a dual clutch assembly and a countershaft.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Accordingly, the total number of gears required in this typical design is two times the number of forward speeds, plus three for reverse. This necessitates a large number of required gear pairs, especially in transmissions that have a relatively large number of forward speed ratios.

The addition of clutches, brakes, and gear sets to achieve these gear ratios and torque ranges may result in inefficient or undesirable transmission weights and sizes. Accordingly, there is a need in the art for a transmission having improved packaging while providing desirable gear ratios and torque ranges.

SUMMARY OF THE INVENTION

The present invention provides a transmission having an input member, an output member, a dual clutch assembly, a countershaft, a plurality of co-planar gear sets, a plurality of interconnecting members, and a plurality of torque transmitting devices. The torque transmitting devices include synchronizer assemblies.

One embodiment of the transmission of the present invention includes an input member, an output member, a first, second, third, fourth, fifth, sixth, seventh, and eighth gear set each having a first gear and a second gear, wherein the output member is continuously connected with the fifth gear set, a first interconnecting member continuously connected to the seventh and eighth gear sets, a second interconnecting member continuously connected with the third and fourth gear sets, and a countershaft continuously connected to the first, second, fifth, and seventh gear sets. A dual clutch assembly is selectively engageable to interconnect the input member with one of the first interconnecting member and the second interconnecting member. Four synchronizer assemblies selectively couple one of the first, second, third, fourth, fifth, sixth, seventh, and eighth gear sets with one of the first interconnecting member, second interconnecting member, and the countershaft. The dual clutch assembly and four synchronizer assemblies are selectively engageable in combinations of at least two to establish at least seven forward speed ratios and at least one reverse speed ratio between the input member and the output member.

In one aspect of the present invention, the first countershaft is located radially outward from and parallel to the input member.

In another aspect of the present invention, the output member is located radially outward from and parallel to the input member.

In yet another aspect of the present invention, a torque converter continuously connected with the input member.

In yet another aspect of the present invention, the dual clutch assembly includes a first clutch for selectively connecting the input member with the first interconnecting member.

In yet another aspect of the present invention, the dual clutch assembly includes a second clutch for selectively connecting the input member with the second interconnecting member.

In yet another aspect of the present invention, the first interconnecting member is located within and concentric with the second interconnecting member.

In yet another aspect of the present invention, the first gear and second gear within each of the first, second, third, fourth, fifth, sixth, seventh, and eighth gear sets are radially aligned.

In yet another aspect of the present invention, the fourth gear set includes a third gear rotatable about an axis radially outward from and parallel to the countershaft, the third gear intermeshed with the first gear and the second gear of the fourth gear set.

In yet another aspect of the present invention, the fifth gear set includes a third gear continuously connected to the output member.

In yet another aspect of the present invention, the first, second, and third gears of the fourth and fifth gear sets are radially aligned.

In yet another aspect of the present invention, a first of the four synchronizer assemblies selectively connects one of the first gear set and the second gear set to the second interconnecting member.

In yet another aspect of the present invention, a second of the four synchronizer assemblies selectively connects one of the third gear set and the fourth gear set to the countershaft.

In yet another aspect of the present invention, a third of the four synchronizer assemblies selectively connects one of the fifth gear set and the sixth gear set to the first interconnecting member.

In yet another aspect of the present invention, a fourth of the four synchronizer assemblies selectively connects one of the seventh gear set and the eighth gear set to the countershaft.

In yet another aspect of the present invention, the first gears are connectable with at least one of the first interconnecting member and the second interconnecting member and wherein the second gears are connectable with the countershaft.

In yet another aspect of the present invention, the first, second, third, fourth, fifth, sixth, seventh, and eighth gear sets are arranged in order from left to right, respectively, and wherein the first gear set is closest to the dual clutch assembly and the eighth gear set is farthest from the dual clutch assembly.

Another embodiment of the transmission includes an input member, an output member, a first, second, third, fourth, fifth, sixth, seventh, and eighth gear set each having a first gear and a second gear, wherein the output member is continuously connected with the fourth gear set, a first interconnecting member continuously connected with the fifth and sixth gear sets, a second interconnecting member continuously connected with the first and second gear sets, a countershaft continuously connected with the third, fourth, seventh, and eighth gear sets, and a dual clutch assembly selectively engageable to interconnect the input member with one of the first interconnecting member and the second interconnecting member. Four synchronizer assemblies selectively couple one of the first, second, third, fourth, fifth, sixth, seventh, and eighth gear sets with one of the first interconnecting member, second interconnecting member, and the countershaft. The first, second, third, fourth, fifth, sixth, seventh, and eighth gear sets are arranged in order from left to right, respectively, wherein the first gear set is closest to the dual clutch assembly and the eighth gear set is farthest from the dual clutch assembly. The dual clutch assembly and four synchronizer assemblies are selectively engageable in combinations of at least two to establish at least seven forward speed ratios and at least one reverse speed ratio between the input member and the output member.

The above features and advantages and other features and advantages of the present invention are readily apparent from the following detailed description of the best modes for carrying out the invention when taken in connection with the accompanying drawings.

DESCRIPTION

Figure 1:
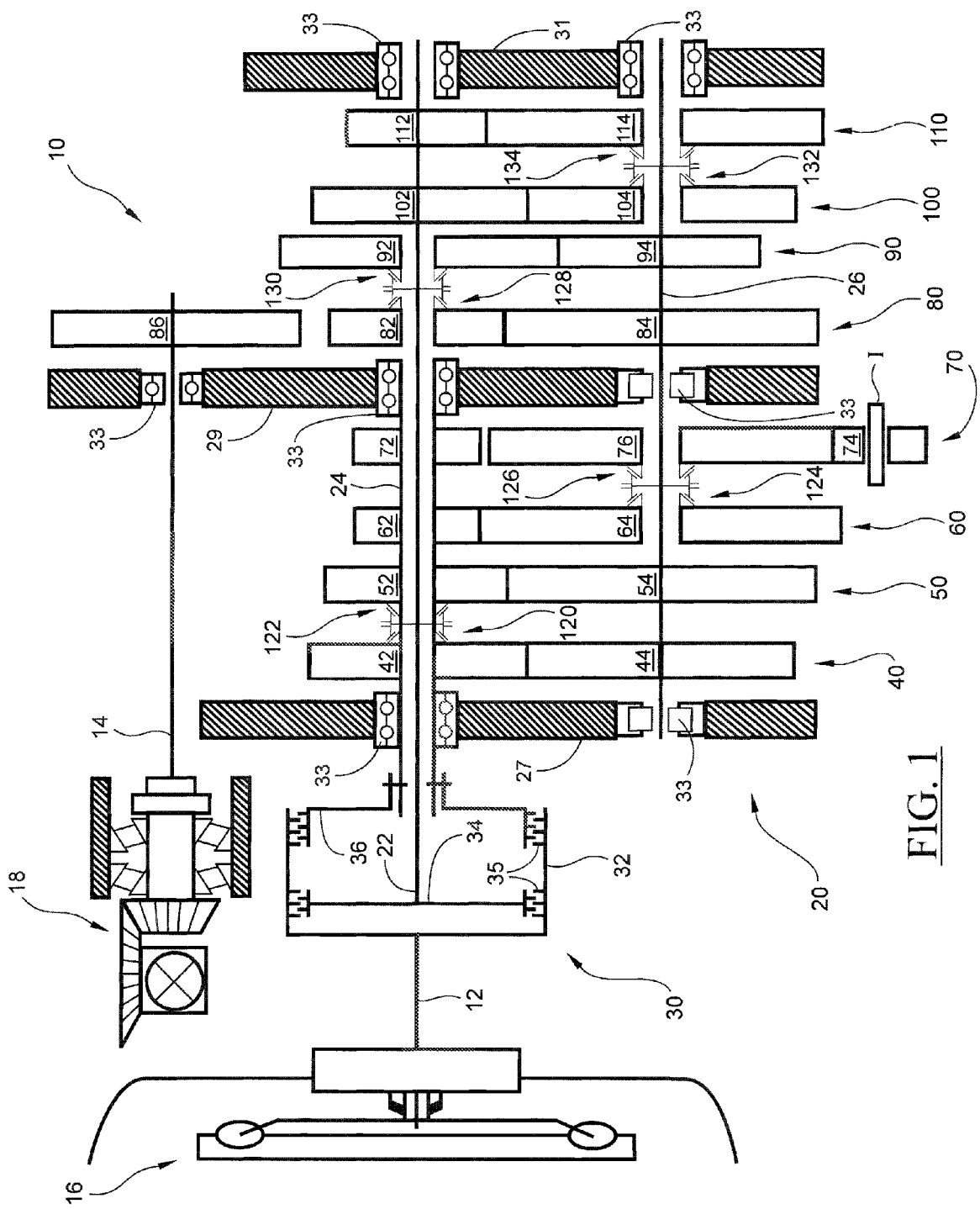
FIG. 1 is a diagram of an embodiment of a multiple speed transmission according to the principles of the present invention.

Referring to the drawings, wherein like reference numbers refer to like components, in FIG. 1 a multi-speed transmission 10 is depicted. The transmission 10 includes an input member 12 and output member 14. In this embodiment, the input member 12 and the output member 14 are shafts, and will be referred to as such. Those skilled in the art will appreciate that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18. The transmission 10 includes a countershaft gearing arrangement 20 that includes interconnecting members, a countershaft, co-planar intermeshing gear sets and selectively engageable synchronizers as will be described herein. For example, the countershaft gearing arrangement 20 includes a first interconnecting shaft or member 22 and a second interconnecting shaft or member 24. The second interconnecting shaft 24 is a sleeve shaft concentric with the first interconnecting shaft 22. The countershaft gearing arrangement 20 further includes a countershaft 26. The countershaft 26 is both spaced apart from and parallel with the input shaft 12, the output shaft 14 and the interconnecting shafts 22, 24. The output shaft 14, the interconnecting shafts 22, 24 and the countershaft 26 are supported by a plurality of support members including a first housing member 27, a second housing member 29, and a third housing member 31. The housing members 27, 29, 31 are fitted with bearings 33 for rotatably supporting the output shaft 14, the first and second interconnecting shafts 22, 24, and the countershaft 26. In the embodiment provided, housing member 27 is disposed closest to the torque converter 16 and the final drive unit 18. Housing member 29 is disposed between housing member 27 and housing member 31.

A dual clutch 30 is connected between input shaft 12 and first and second interconnecting shafts 22, 24. The dual clutch 30 includes a clutch housing 32 connected for common rotation with input shaft 12. Further, clutch 30 has first and second clutch elements or hubs 34 and 36. Clutch elements 34 and 36 together with housing 32 are configured to form a friction clutch, as well known in the art as a dual clutch. More specifically, clutch elements 34, 36 and clutch housing 32 have friction plates 35 mounted thereon that interact to form a friction clutch. Further, clutch element 34 is connected for common rotation with first interconnecting shaft 22 and clutch element 36 is connected for common rotation with second interconnecting shaft 24. Thus, selective engagement of clutch element 34 with clutch housing 32 connects the input shaft 12 for common rotation with first interconnecting shaft 22 and selective engagement of clutch element 36 with clutch housing 32 connects input shaft 12 for common rotation with second interconnecting shaft 24.

The countershaft gearing arrangement 20 also includes co-planar, intermeshing gear sets 40, 50, 60, 70, 80, 90, 100 and 110. In the embodiment provided, gear sets 40, 50, 60, and 70 are disposed between housing member 27 and housing member 29 and gear sets 80, 90, 100, and 110 are disposed between housing member 29 and housing member 31.

Co-planar gear set 40 includes gear 42 and gear 44. Gear 42 is selectively connectable for common rotation with the second interconnecting shaft 24 and intermeshes with gear 44. Gear 44 is connected for common rotation with countershaft 26.

Co-planar gear set 50 includes gear 52 and gear 54. Gear 52 is selectively connectable for common rotation with second interconnecting shaft 24 and intermeshes with gear 54. Gear 54 is connected for common rotation with countershaft 26.

Co-planar gear set 60 includes gear 62 and gear 64. Gear 62 is connected for common rotation with second interconnecting shaft 24 and intermeshes with gear 64. Gear 64 is selectively connectable for common rotation with countershaft 26.

Co-planar gear set 70 includes intermeshing gears 72, 74 and 76. Gear 72 is connected for common rotation with second interconnecting shaft 24 and intermeshes with idler gear 74. Idler gear 74 is rotatable about idler axis I. Gear 74 also intermeshes with gear 76. Gear 76 is selectively connectable with countershaft 26.

Co-planar gear set 80 includes intermeshing gears 82, 84 and 86. Gear 82 is selectively connectable for common rotation with first interconnecting shaft 22 and intermeshes with gear 84. Gear 84 is connected for common rotation with countershaft 26 and also intermeshes with gear 86. Gear 86 is connected for common rotation with output shaft 14.

Co-planar gear set 90 includes intermeshing gears 92 and 94. Gear 92 is selectively connectable for common rotation with first interconnecting shaft 22 and intermeshes with gear 94. Gear 94 is connected for common rotation with the countershaft 26.

Co-planar gear set 100 includes intermeshing gears 102 and 104. Gear 102 is connected for common rotation with first interconnecting shaft 22. Gear 102 intermeshes with gear 104. Gear 104 is selectively connectable for common rotation with countershaft 26.

Co-planar gear set 110 includes intermeshing gears 112 and 114. Gear 112 is connected for common rotation with first interconnecting shaft 22. Gear 112 intermeshes with gear 114. Gear 114 is selectively connectable for common rotation with the countershaft 26.

The transmission 10 further includes a plurality of selectively engageable synchronizers 120, 122, 124, 126, 128, 130, 132 and 134. Synchronizers 120/122, 124/126, 128/130, 132/134 are a left and right side of the synchronizer assemblies, sharing a common synchronizer hub and sleeve. Synchronizer 120 is selectively engageable to connect gear 42 with second interconnecting shaft 24 for common rotation therewith. Synchronizer 122 is selectively engageable to connect gear 52 with second interconnecting shaft 24 for common rotation therewith. Synchronizer 124 is selectively engageable to connect gear 64 with countershaft 26 for common rotation therewith. Synchronizer 126 is selectively engageable to connect gear 76 with countershaft 26 for common rotation therewith. Synchronizer 128 is selectively engageable to connect gear 82 with first interconnecting shaft 22 for common rotation therewith. Synchronizer 130 is selectively engageable to connect gear 92 with first interconnecting shaft 22 for common rotation therewith. Synchronizer 132 is selectively engageable to connect gear 104 with countershaft 26 for common rotation therewith. Synchronizer 134 is selectively engageable to connect gear 114 with countershaft 26 for common rotation therewith.

The transmission 10 is capable of transmitting torque from the input shaft 12 to the output shaft 14 in at least seven forward torque ratios and one reverse torque ratio. Each of the forward torque ratios and the reverse torque ratio is attained by engagement of dual clutch 30 and one of the clutch elements 34, 36 and one or more of the synchronizers 120, 122, 124, 126, 128, 130, 132 and 134. Those skilled in the art will readily understand that a different speed ratio is associated with each torque ratio.

To establish the reverse torque ratio clutch element 36 of the dual clutch 30 and synchronizer 126 are engaged. By this engagement, clutch element 36 of the dual clutch 30 transfers torque from the input shaft 12 through clutch housing 32 to the second interconnecting shaft 24. Further, torque is transferred from the second interconnecting shaft 24 through gear 72 to idler gear 74. Idler gear 74 transfers the torque to gear 76. Upon engagement of synchronizer 126, gear 76 transfers torque to countershaft 26. Countershaft 26 transfers the torque to gear 84. Gear 84 transfers torque to gear 86, which in turn transfers the torque to output shaft 14. Output shaft 14 transfers the torque to the final drive unit 18.

A first forward torque ratio (1st gear) is achieved by engaging clutch element 34 of the dual clutch 30 and synchronizer 134. By this engagement, clutch element 34 of the dual clutch 30 transfers torque from the input shaft 12 through clutch housing 32 to the first interconnecting shaft 22. Further, torque is transferred from the first interconnecting shaft 22 to gear 112. Gear 112 transfers the torque to gear 114. Upon engagement of synchronizer 134, gear 114 transfers torque to countershaft 26. Countershaft 26 transfers the torque to gear 84. Gear 84 transfers torque to gear 86, which in turn transfers the torque to output shaft 14. Output shaft 14 transfers the torque to the final drive unit 18.

A subsequent forward torque ratio (2nd gear) is established by engagement of clutch element 36 of the dual clutch 30 and synchronizer 124. By this engagement, clutch element 36 of the dual clutch 30 transfers torque from the input shaft 12 through clutch housing 32 to the second interconnecting shaft 24. Further, torque is transferred from the second interconnecting shaft 24 to gear 62. Gear 62 transfers the torque to gear 64. Upon engagement of synchronizer 124, gear 64 transfers torque to countershaft 26. Countershaft 26 transfers the torque to gear 84. Gear 84 transfers torque to gear 86, which in turn transfers the torque to output shaft 14. Output shaft 14 transfers the torque to the final drive unit 18.

The subsequent torque ratio (3rd gear) is established by engagement of clutch element 34 of the dual clutch 30 and synchronizer 132. By this engagement, clutch element 34 of the dual clutch 30 transfers torque from the input shaft 12 through clutch housing 32 to the first interconnecting shaft 22. Further, torque is transferred from the first interconnecting shaft 22 to gear 102. Gear 102 transfers the torque to gear 104. Upon engagement of synchronizer 132, gear 104 transfers torque to countershaft 26. Countershaft 26 transfers the torque to gear 84. Gear 84 transfers torque to gear 86, which in turn transfers the torque to output shaft 14. Output shaft 14 transfers the torque to the final drive unit 18.

The next subsequent forward torque ratio (4th gear) is established by engagement of clutch element 36 of the dual clutch 30 and synchronizer 122. By this engagement, clutch element 36 of the dual clutch 30 transfers torque from the input shaft 12 through clutch housing 32 to the second interconnecting shaft 24. Further, upon engagement of synchronizer 122 torque is transferred from the second interconnecting shaft 24 to gear 52. Gear 52 transfers the torque to gear 54. Gear 54 transfers torque to countershaft 26. Countershaft 26 transfers the torque to gear 84. Gear 84 transfers torque to gear 86, which in turn transfers the torque to output shaft 14. Output shaft 14 transfers the torque to the final drive unit 18.

The subsequent torque ratio (5th gear) is established by engagement of clutch element 34 of the dual clutch 30 and synchronizer 128. By this engagement, clutch element 34 of the dual clutch 30 transfers torque from the input shaft 12 through clutch housing 32 to the first interconnecting shaft 22. Further, upon engagement of synchronizer 122 the torque is transferred from the first interconnecting shaft 22 to gear 82. Gear 82 transfers the torque to gear 84. Gear 84 transfers torque to countershaft 26 and gear 86. Gear 86 transfers torque to output shaft 14. Output shaft 14 transfers the torque to the final drive unit 18.

A subsequent forward torque ratio (6th gear) is established by engagement of clutch element 36 of the dual clutch 30 and synchronizer 120. By this engagement, clutch element 36 of the dual clutch 30 transfers torque from the input shaft 12 through clutch housing 32 to the second interconnecting shaft 24. Further, torque is transferred from the second interconnecting shaft 24 to gear 42 through the synchronizer 120. Gear 42 transfers the torque to gear 44. Gear 44 transfers torque to countershaft 26. Countershaft 26 transfers the torque to gear 84. Gear 84 transfers torque to gear 86, which in turn transfers the torque to output shaft 14. Output shaft 14 transfers the torque to the final drive unit 18.

The subsequent torque ratio (7th gear) is established by engagement of clutch element 34 of the dual clutch 30 and synchronizer 130. By this engagement, clutch element 34 of the dual clutch 30 transfers torque from the input shaft 12 through clutch housing 32 to the first interconnecting shaft 22. Further, torque is transferred from the first interconnecting shaft 22 to gear 92 through synchronizer 130. Gear 92 transfers the torque to gear 94. Gear 94 transfers torque to countershaft 26. Countershaft 26 transfers the torque to gear 84. Gear 84 transfers torque to gear 86, which in turn transfers the torque to output shaft 14. Output shaft 14 transfers the torque to the final drive unit 18.

The present invention contemplates that a variety of torque ratios (i.e., the ratio of torque of the output member 14 to the input member 12) are achievable through the selection of tooth counts of the gears of the transmission 10. Moreover, the present invention advantageously provides the transfer gears 82, 84, 86 in a single plane. This arrangement provides the opportunity to reduce transmission length in comparison with double plane transfer gears. Further, flexibility is provided in the selection of gear ratios with respect to 1st though 7th gear by utilizing single mesh pinions (separate pinions for each gear). Additional transmission length reduction is achieved through the use of single plane idler gear 74. Moreover, the single countershaft design decreases the radial packaging requirements of the transmission.

Figure 2:
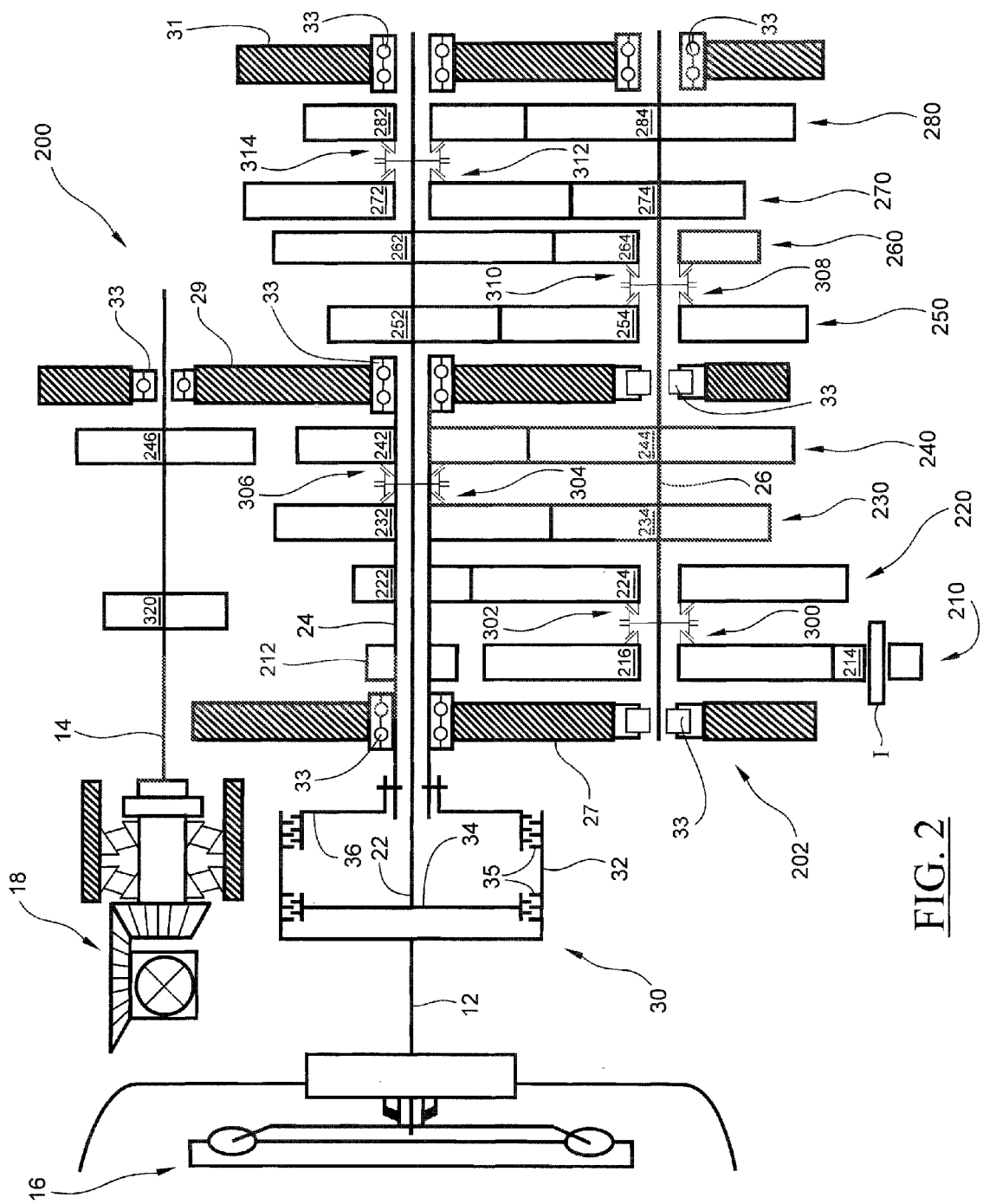
FIG. 2 is a diagram of another embodiment of a multiple speed transmission according to the principles of the present invention.

Referring now to FIG. 2, an alternate embodiment of the present invention is illustrated as a multi-speed transmission 200. The transmission 200 includes an input member 12 and output member 14. In this embodiment, the input member 12 and the output member 14 are shafts, and will be referred to as such. Those skilled in the art will appreciate that the input and output members 12, 14 may be components other than shafts. The input shaft 12 is continuously connected with a torque converter 16 or other starting device. An engine (not shown) is connected to and provides a driving torque to the torque converter 16. The output shaft 14 is continuously connected with a final drive unit 18. The transmission 200 includes a countershaft gearing arrangement 202 that includes interconnecting shafts, a countershaft, co-planar intermeshing gear sets and selectively engageable synchronizers as will be described herein. For example, the countershaft gearing arrangement 202 includes a first interconnecting shaft 22 and a second interconnecting shaft 24, which is a sleeve shaft concentric with the first interconnecting shaft 22. The countershaft gearing arrangement 202 further includes a countershaft 26. The countershaft 26 is both spaced apart from and parallel with the input shaft 12, the output shaft 14 and the interconnecting shafts 22, 24. The output shaft 14, the interconnecting shafts 22, 24 and the countershaft 26 are supported by a plurality of support members including a first housing member 27, a second housing member 29, and a third housing member 31. The housing members 27, 29, 31 are fitted with bearings 33 for rotatably supporting the output shaft 14, the first and second interconnecting shafts 22, 24, and the countershaft 26. In the embodiment provided, housing member 27 is disposed closest to the torque converter 16 and the final drive unit 18. Housing member 29 is disposed between housing member 27 and housing member 31.

A dual clutch 30 is connected between input shaft 12 and first and second interconnecting shafts 22, 24. The dual clutch 30 includes a clutch housing 32 connected for common rotation with input shaft 12. Further, clutch 30 has first and second clutch elements or hubs 34 and 36. Clutch elements 34 and 36 together with housing 32 are configured to form a friction clutch, as well known in the art as a dual clutch. More specifically, clutch elements 34, 36 and clutch housing 32 have friction plates mounted thereon that interact to form a friction clutch. Further, clutch element 34 is connected for common rotation with first interconnecting shaft 22 and clutch element 36 is connected for common rotation with second interconnecting shaft 24. Thus, selective engagement of clutch element 34 with clutch housing 32, connects the input shaft 12 for common rotation with first interconnecting shaft 22 and selective engagement of clutch element 36 with clutch housing 32, connects the input shaft 12 for common rotation with second interconnecting shaft 24.

The countershaft gearing arrangement 202 also includes co-planar, intermeshing gear sets 210, 220, 230, 240, 250, 260, 270 and 280. In the embodiment provided, gear sets 210, 220, 230, and 240 are disposed between housing member 27 and housing member 29 and gear sets 250, 260, 270, and 280 are disposed between housing member 29 and housing member 31.

Co-planar gear set 210 includes gears 212, 214 and 216. Gear 212 is connected for common rotation with the second interconnecting shaft 24 and intermeshes with idler gear 214. Idler gear 214 is rotatable about idler axis I and intermeshes with gear 216. Gear 216 is selectively connectable for common rotation with countershaft 26.

Co-planar gear set 220 includes gear 222 and gear 224. Gear 222 is connected for common rotation with the second interconnecting shaft 24 and intermeshes with gear 224. Gear 224 is selectively connectable for common rotation with countershaft 26.

Co-planar gear set 230 includes gear 232 and gear 234. Gear 232 is selectively connectable for common rotation with second interconnecting shaft 24 and intermeshes with gear 234. Gear 234 is connected for common rotation with countershaft 26.

Co-planar gear set 240 includes intermeshing gears 242, 244 and 246. Gear 242 is selectively connectable for common rotation with second interconnecting shaft 24 and intermeshes with gear 244. Gear 244 is connected for common rotation with countershaft 26. Gear 244 also intermeshes with gear 246. Gear 246 is connected for common rotation with output shaft 14.

Co-planar gear set 250 includes intermeshing gears 252 and 254. Gear 252 is connected for common rotation with first interconnecting shaft 22 and intermeshes with gear 254. Gear 254 is selectively connectable for common rotation with countershaft 26.

Gear set 260 includes co-planar, intermeshing gears 262 and 264. Gear 262 is connected for common rotation with first interconnecting shaft 22. Gear 264 is selectively connectable for common rotation with the countershaft 26.

Gear set 270 includes co-planar, intermeshing gears 272 and 274. Gear 272 is selectively connectable for common rotation with first interconnecting shaft 22. Gear 272 intermeshes with gear 274. Gear 274 is connected for common rotation with countershaft 26.

Co-planar gear set 280 includes intermeshing gears 282 and 284. Gear 282 is selectively connectable for common rotation with first interconnecting shaft 22. Gear 282 intermeshes with gear 284. Gear 284 is connected for common rotation with the countershaft 26.

The transmission 200 further includes a plurality of selectively engageable synchronizers 300, 302, 304, 306, 308, 310, 312 and 314. Synchronizers 300/302, 304/306, 308/310, 312/314 are a left and right side of the synchronizer assemblies, sharing a common synchronizer hub and sleeve. Synchronizer 300 is selectively engageable to connect gear 216 with countershaft 26 for common rotation therewith. Synchronizer 302 is selectively engageable to connect gear 224 with countershaft 26 for common rotation therewith. Synchronizer 304 is selectively engageable to connect gear 232 with second interconnecting shaft 24 for common rotation therewith. Synchronizer 306 is selectively engageable to connect gear 242 with second interconnecting shaft 24 for common rotation therewith. Synchronizer 308 is selectively engageable to connect gear 254 with countershaft 26 for common rotation therewith. Synchronizer 310 is selectively engageable to connect gear 264 with countershaft 26 for common rotation therewith. Synchronizer 312 is selectively engageable to connect gear 272 with first interconnecting shaft 22 for common rotation therewith. Synchronizer 314 is selectively engageable to connect gear 282 with countershaft 22 for common rotation therewith.

The transmission 200 is capable of transmitting torque from the input shaft 12 to the output shaft 14 in at least seven forward torque ratios and one reverse torque ratio. Each of the forward torque ratios and the reverse torque ratio is attained by engagement of dual clutch 30 and one of the clutch elements 34, 36 and one or more of the synchronizers 300, 302, 304, 306, 308, 310, 312 and 314. Those skilled in the art will readily understand that a different speed ratio is associated with each torque ratio.

To establish the reverse torque ratio clutch element 36 of the dual clutch 30 and synchronizer 300 are engaged. By this engagement, clutch element 36 of the dual clutch 30 transfers torque from the input shaft 12 through clutch housing 32 to the second interconnecting shaft 24. Further, torque is transferred from the second interconnecting shaft 24 through gear 212 to idler gear 210. Idler gear 210 transfers the torque to gear 216. Upon engagement of synchronizer 300, gear 216 transfers torque to countershaft 26. Countershaft 26 transfers the torque to gear 244. Gear 244 transfers torque to gear 246, which in turn transfers the torque to output shaft 14. Output shaft 14 transfers the torque to the final drive unit 18.

A first forward torque ratio (1st gear) is achieved by engaging clutch element 34 of the dual clutch 30 and synchronizer 308. By this engagement, clutch element 34 of the dual clutch 30 transfers torque from the input shaft 12 through clutch housing 32 to the first interconnecting shaft 22. Further, torque is transferred from the first interconnecting shaft 22 to gear 252. Gear 252 transfers the torque to gear 254. Upon engagement of synchronizer 308, gear 254 transfers torque to countershaft 26. Countershaft 26 transfers the torque to gear 244. Gear 244 transfers torque to gear 246, which in turn transfers the torque to output shaft 14. Output shaft 14 transfers the torque to the final drive unit 18.

A subsequent forward torque ratio (2nd gear) is established by engagement of clutch element 36 of the dual clutch 30 and synchronizer 302. By this engagement, clutch element 36 of the dual clutch 30 transfers torque from the input shaft 12 through clutch housing 32 to the second interconnecting shaft 24. Further, torque is transferred from the second interconnecting shaft 24 to gear 222. Gear 222 transfers the torque to gear 224. Upon engagement of synchronizer 302, gear 224 transfers torque to countershaft 26. Countershaft 26 transfers the torque to gear 244. Gear 244 transfers torque to gear 246, which in turn transfers the torque to output shaft 14. Output shaft 14 transfers the torque to the final drive unit 18.

The subsequent torque ratio (3rd gear) is established by engagement of clutch element 34 of the dual clutch 30 and synchronizer 310. By this engagement, clutch element 34 of the dual clutch 30 transfers torque from the input shaft 12 through clutch housing 32 to the first interconnecting shaft 22. Further, torque is transferred from the first interconnecting shaft 22 to gear 262. Gear 262 transfers the torque to gear 264. Upon engagement of synchronizer 310, gear 264 transfers torque to countershaft 26. Countershaft 26 transfers the torque to gear 244. Gear 244 transfers torque to gear 246, which in turn transfers the torque to output shaft 14. Output shaft 14 transfers the torque to the final drive unit 18.

The next subsequent forward torque ratio (4th gear) is established by engagement of clutch element 36 of the dual clutch 30 and synchronizer 306. By this engagement, clutch element 36 of the dual clutch 30 transfers torque from the input shaft 12 through clutch housing 32 to the second interconnecting shaft 24. Further, upon engagement of synchronizer 306 torque is transferred from the second interconnecting shaft 24 to gear 242. Gear 242 transfers the torque to gear 244. Gear 244 transfers torque to gear 246, which in turn transfers the torque to output shaft 14. Output shaft 14 transfers the torque to the final drive unit 18.

The subsequent torque ratio (5th gear) is established by engagement of clutch element 34 of the dual clutch 30 and synchronizer 314. By this engagement, clutch element 34 of the dual clutch 30 transfers torque from the input shaft 12 through clutch housing 32 to the first interconnecting shaft 22. Further, upon engagement of synchronizer 314 torque is transferred from the first interconnecting shaft 22 to gear 282. Gear 282 transfers the torque to gear 284. Gear 284 transfers torque to countershaft 26. Countershaft 26 transfers the torque to gear 244. Gear 244 transfers torque to gear 246, which in turn transfers the torque to output shaft 14. Output shaft 14 transfers the torque to the final drive unit 18.

A subsequent forward torque ratio (6th gear) is established by engagement of clutch element 36 of the dual clutch 30 and synchronizer 304. By this engagement, clutch element 36 of the dual clutch 30 transfers torque from the input shaft 12 through clutch housing 32 to the second interconnecting shaft 24. Further, upon engagement of synchronizer 304 torque is transferred from the second interconnecting shaft 24 to gear 232. Gear 232 transfers the torque to gear 234. Gear 234 transfers torque to countershaft 26. Countershaft 26 transfers the torque to gear 244. Gear 244 transfers torque to gear 246, which in turn transfers the torque to output shaft 14. Output shaft 14 transfers the torque to the final drive unit 18.

The subsequent torque ratio (7th gear) is established by engagement of clutch element 34 of the dual clutch 30 and synchronizer 312. By this engagement, clutch element 34 of the dual clutch 30 transfers torque from the input shaft 12 through clutch housing 32 to the first interconnecting shaft 22. Further, torque is transferred from the first interconnecting shaft 22 to gear 272 through synchronizer 312. Gear 272 transfers the torque to gear 274. Gear 274 transfers torque to countershaft 26. Countershaft 26 transfers the torque to gear 244. Gear 244 transfers torque to gear 246, which in turn transfers the torque to output shaft 14. Output shaft 14 transfers the torque to the final drive unit 18.

The present invention contemplates that a variety of torque ratios (i.e., the ratio of torque of the output member 14 to the input member 12) are achievable through the selection of tooth counts of the gears of the transmission 200. Further, exceptional gear ratio flexibility is provided in the selection of gear ratios with respect to 1st, 2nd, 3rd, 5th, 6th and 7th and reverse gear, as the pinions 212, 222, 232, 242, 252, 262, 272, and 282 are single mesh pinions (i.e. each pinion meshes with only one gear). An overall transmission length reduction is achieved through the use of: (1) a reverse idler gear in a single plane; (2) a single plane of transfer gears; and (3) a single countershaft design, which decreases the radial packaging requirements of the transmission.

In yet another embodiment of the present invention, a parking gear 320 is provided. Parking gear 320, as shown in FIG. 2, is connected for common rotation with output shaft 14. Upon activation of the parking actuator (not shown) parking gear 320 is rotationally fixed and, thus, prevents output shaft 14 from rotating. The present invention contemplates that parking gear 320 may be located at other locations along output shaft 14.

While the best modes for carrying out the invention have been described in detail, those familiar with the art to which this invention relates will recognize various alternative designs and embodiments for practicing the invention within the scope of the appended claims.

The invention claimed is:
1. A transmission comprising:
an input member;
an output member;
a first, second, third, fourth, fifth, sixth, seventh, and eighth gear set each having a first gear and a second gear, wherein the output member is directly continuously connected with one of the gear sets;
a first interconnecting member continuously connected to the seventh and eighth gear sets;

a second interconnecting member continuously connected with the third and fourth gear sets;
a countershaft continuously connected to the first, second, fifth, and sixth gear sets;
a dual clutch assembly selectively engageable to interconnect the input member with one of the first interconnecting member and the second interconnecting member; and
four synchronizer assemblies each for selectively coupling at least one of the first, second, third, fourth, fifth, sixth, seventh, and eighth gear sets with at least one of the first interconnecting member, second interconnecting member, and the countershaft, and
wherein the dual clutch assembly and four synchronizer assemblies are selectively engageable in combinations of at least two to establish at least seven forward speed ratios and at least one reverse speed ratio between the input member and the output member.

2. The transmission of claim 1 wherein the countershaft is located radially outward from and parallel to the input member.

3. The transmission of claim 2 wherein the output member is located radially outward from and parallel to the input member.

4. The transmission of claim 3 wherein the first interconnecting member is concentric with the second interconnecting member.

5. The transmission of claim 4 further comprising a torque converter continuously connected with the input member.

6. The transmission of claim 1 wherein the dual clutch assembly includes a first clutch for selectively connecting the input member with the first interconnecting member and a second clutch for selectively connecting the input member with the second interconnecting member.

7. The transmission of claim 1 wherein the output member is continuously connected with the fifth gear set.

8. The transmission of claim 1 wherein the first gear and second gear within each of the first, second, third, fourth, fifth, sixth, seventh, and eighth gear sets are radially aligned.

9. The transmission of claim 8 wherein the fourth gear set includes a third gear rotatable about an axis radially outward from and parallel to the countershaft, the third gear intermeshed with the first gear and the second gear of the fourth gear set.

10. The transmission of claim 9 wherein the fifth gear set includes a third gear continuously connected to the output member.

11. The transmission of claim 10 wherein the first, second, and third gears of the fourth and fifth gear sets are radially aligned.

12. The transmission of claim 1 wherein a first of the four synchronizer assemblies selectively connects one of the first gear set and the second gear set to the second interconnecting member.

13. The transmission of claim 12 wherein a second of the four synchronizer assemblies selectively connects one of the third gear set and the fourth gear set to the countershaft.

14. The transmission of claim 13 wherein a third of the four synchronizer assemblies selectively connects one of the fifth gear set and the sixth gear set to the first interconnecting member.

15. The transmission of claim 14 wherein a fourth of the four synchronizer assemblies selectively connects one of the seventh gear set and the eighth gear set to the countershaft.

16. The transmission of claim 1 wherein the first gears are connectable with at least one of the first interconnecting member and the second interconnecting member and wherein the second gears are connectable with the countershaft.

17. A transmission comprising:
an input member;
an output member;
a first, second, third, fourth, fifth, sixth, seventh, and eighth gear set each having a first gear and a second gear, wherein the output member is directly continuously connected with the fifth gear set;
a first interconnecting member continuously connected to the seventh and eighth gear sets;
a second interconnecting member continuously connected with the third and fourth gear sets;
a countershaft continuously connected to the first, second, fifth, and sixth gear sets;
a dual clutch assembly having a first clutch for selectively connecting the input member with the first interconnecting member and a second clutch for selectively connecting the input member with the second interconnecting member;
a first synchronizer assembly for selectively connecting one of the first gear set and the second gear set to the second interconnecting member;
a second synchronizer assembly for selectively connecting one of the third gear set and the fourth gear set to the countershaft;
a third synchronizer assembly for selectively connecting one of the fifth gear set and the sixth gear set to the first interconnecting member; and
a fourth synchronizer assembly for selectively connecting one of the seventh gear set and the eighth gear set to the countershaft,
wherein the dual clutch assembly and four synchronizer assemblies are selectively engageable in combinations of at least two to establish at least seven forward speed ratios and at least one reverse speed ratio between the input member and the output member.

18. The transmission of claim 17 wherein the first gear and second gear within each of the first, second, third, fourth, fifth, sixth, seventh, and eighth gear sets are radially aligned.

19. The transmission of claim 18 wherein the fourth gear set includes a third gear rotatable about an axis radially outward from and parallel to the countershaft, the third gear intermeshed with the first gear and the second gear of the fourth gear set, wherein the fifth gear set includes a third gear continuously connected to the output member, and wherein the first, second, and third gears of the fourth and fifth gear sets are radially aligned.

20. The transmission of claim 19 wherein the first gears are connectable with at least one of the first interconnecting member and the second interconnecting member and wherein the second gears are connectable with the countershaft.

21. The transmission of claim 20 wherein the first gear set is adjacent the dual clutch assembly, the second gear set is adjacent the first gear set, the third gear set is adjacent the second gear set, the fourth gear set is adjacent the third gear set, the fifth gear set is adjacent the fourth gear set, the sixth gear set is adjacent the fifth gear set, the seventh gear set is adjacent the sixth gear set, and the eighth gear set is adjacent the seventh gear set.

22. A transmission comprising:
an input member;
an output member;
a first, second, third, fourth, fifth, sixth, seventh, and eighth gear set each having a first gear and a second gear, wherein the output member is continuously connected with the fourth gear set;

a first interconnecting member continuously connected with the fifth and sixth gear sets;

a second interconnecting member continuously connected with the first and second gear sets;

a countershaft continuously connected with the third, fourth, seventh, and eighth gear sets;

a dual clutch assembly selectively engageable to interconnect the input member with one of the first interconnecting member and the second interconnecting member; and four synchronizer assemblies each for selectively coupling at least one of the first, second, third, fourth, fifth, sixth, seventh, and eighth gear sets with at least one of the first interconnecting member, second interconnecting member, and the countershaft, wherein the first gear set is adjacent the dual clutch assembly, the second gear set is adjacent the first gear set, the third gear set is adjacent the second gear set, the fourth gear set is adjacent the third gear set, the fifth gear set is adjacent the fourth gear set, the sixth gear set is adjacent the fifth gear set, the seventh gear set is adjacent the sixth gear set, and the eighth gear set is adjacent the seventh gear set, and wherein the dual clutch assembly and four synchronizer assemblies are selectively engageable in combinations of at least two to establish at least seven forward speed ratios and at least one reverse speed ratio between the input member and the output member.

23. The transmission of claim 22 further comprising a parking gear connected to the output member for selectively fixing the output member from rotation.

24. A transmission comprising:

an input member;

an output member;

a first, second, third, fourth, fifth, sixth, seventh, and eighth gear set each having a first gear and a second gear, wherein the output member is continuously connected with the fourth gear set;

a first interconnecting member continuously connected to the fifth and sixth gear sets;

a second interconnecting member continuously connected with the first and second gear sets;

a countershaft continuously connected to the third, fourth, seventh, and eighth gear sets;

a dual clutch assembly having a first clutch for selectively connecting the input member with the first interconnecting member and a second clutch for selectively connecting the input member with the second interconnecting member;

a first synchronizer assembly for selectively connecting one of the first gear set and the second gear set to the countershaft;

a second synchronizer assembly for selectively connecting one of the third gear set and the fourth gear set to the second interconnecting member;

a third synchronizer assembly for selectively connecting one of the fifth gear set and the sixth gear set to the countershaft; and a fourth synchronizer assembly for selectively connecting one of the seventh gear set and the eighth gear set to the first interconnecting member, wherein the first gear set is adjacent the dual clutch assembly, the second gear set is adjacent the first gear set, the third gear set is adjacent the second gear set, the fourth gear set is adjacent the third gear set, the fifth gear set is adjacent the fourth gear set, the sixth gear set is adjacent the fifth gear set, the seventh gear set is adjacent the sixth gear set, and the eighth gear set is adjacent the seventh gear set, and wherein the dual clutch assembly and four synchronizer assemblies are selectively engageable in combinations of at least two to establish at least seven forward speed ratios and at least one reverse speed ratio between the input member and the output member.

* * * * *